United States Patent
Waite, III et al.

(10) Patent No.: US 10,634,071 B2
(45) Date of Patent: Apr. 28, 2020

(54) METHOD OF OFFERING FINELY CALIBRATED ENGINE SPEED CONTROL TO A LARGE NUMBER OF DIVERSE POWER TAKE-OFF (PTO) APPLICATIONS

(71) Applicant: PACCAR Inc, Bellevue, WA (US)

(72) Inventors: Burton Edwin Waite, III, Bellingham, WA (US); James David Castner, Shoreline, WA (US); Charles Wayne Reinhardt Swart, Bellingham, WA (US)

(73) Assignee: PACCAR INC, Bellevue, WA (US)

( * ) Notice: Subject to any disclaimer, the term of this patent is extended or adjusted under 35 U.S.C. 154(b) by 579 days.

(21) Appl. No.: 15/136,684

(22) Filed: Apr. 22, 2016

(65) Prior Publication Data
US 2017/0306862 A1 Oct. 26, 2017

(51) Int. Cl.
  *F02D 31/00* (2006.01)
  *F02D 29/02* (2006.01)

(52) U.S. Cl.
  CPC ........... *F02D 31/001* (2013.01); *F02D 29/02* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,123,302 A * | 6/1992 | Brown | ................... | F16H 61/061 477/154 |
| 8,806,975 B2 * | 8/2014 | Schneider | .............. | B60K 17/28 701/22 |
| 9,187,098 B2 * | 11/2015 | Love | ........................ | B60P 1/162 |
| 2002/0179047 A1 * | 12/2002 | Hoang | ................... | B60K 6/485 123/350 |
| 2003/0034006 A1 * | 2/2003 | Richard | ................ | F02D 31/001 123/352 |
| 2004/0073354 A1 * | 4/2004 | Hartmann | ............. | F02D 31/001 701/110 |
| 2005/0154519 A1 * | 7/2005 | Kim | ...................... | B60W 10/02 701/51 |
| 2006/0096554 A1 * | 5/2006 | Shiozaki | ................... | F01P 7/04 123/41.12 |
| 2007/0006572 A1 * | 1/2007 | Yu | ........................... | F01N 3/021 60/285 |

(Continued)

OTHER PUBLICATIONS

"PID Controller," Wikipedia, The Free Encyclopedia, Apr. 19, 2016, <https://en.wikipedia.org/w/index.php?title=PID_controller&oldid=716008085> [retrieved Jul. 5, 2016], 19 pages.

*Primary Examiner* — Stephen K Cronin
*Assistant Examiner* — Ruben Picon-Feliciano

(57) ABSTRACT

Systems and methods are provided for controlling a power plant during use of a power take-off (PTO) device, wherein the responsiveness and stability of the controller are adjustable by an operator in the field. The use of setting maps allows fine tuning of controller responsiveness while also ensuring that expected performance would be achieved at any setting within the setting map. In some embodiments, a proportional-integral-derivative (PID) controller is used to control engine speed, and gains for the proportional, integral, and derivative terms are obtained from setting maps based on a responsiveness setting chosen by a vehicle operator.

14 Claims, 8 Drawing Sheets

(56) References Cited

U.S. PATENT DOCUMENTS

| | | | | |
|---|---|---|---|---|
| 2009/0187316 A1* | 7/2009 | Romine | ............... | B60K 17/28 |
| | | | | 701/51 |
| 2011/0118071 A1* | 5/2011 | De Maziere | ............ | F16H 15/38 |
| | | | | 475/114 |
| 2014/0163827 A1* | 6/2014 | Kim | ...................... | B60W 10/11 |
| | | | | 701/54 |
| 2015/0307098 A1* | 10/2015 | Maeda | ............... | B60W 30/143 |
| | | | | 477/120 |
| 2017/0197625 A1* | 7/2017 | Omran | ................ | B60K 17/28 |

* cited by examiner

METHOD OF OFFERING FINELY CALIBRATED ENGINE SPEED CONTROL TO A LARGE NUMBER OF DIVERSE POWER TAKE-OFF (PTO) APPLICATIONS

BACKGROUND

The use of power take-off (PTO) devices to provide power to accessories on vehicles such as trucks is a well-known technology. When using a PTO device to power an accessory, it is desirable to use automated speed controllers to control the amount of power produced by a power plant such as an engine. Currently, many engine speed controllers for use while a PTO device is active use a proportional-integral-derivative (PID) control technique to establish and hold engine speed set points. In a PID control technique for managing engine speed, an error value is determined as a difference between a target engine speed value and an actual engine speed value. The PID control technique determines a corrected torque demand by determining a proportional term value (related to the current value of the error), an integral term value (related to past values of the error), and a derivative term value (related to the rate of change of values of the error), multiplying each of these values by respective gain values, and adding the resulting products. Behavior of the PID control technique may be changed by altering the proportional gain value, the integral gain value, and the derivative gain value.

There are a wide variety of accessories that may be powered by a PTO device, many of which have different engine speed, load, and response requirements/characteristics. Typically, the control characteristics of the PID control technique are fixed for a given vehicle model or engine model. For vehicle and engine models that can have multiple configurations with different accessories, fixed control characteristics make meeting the customer demands and/or accessory operating requirements difficult. For example, one instance of a given vehicle model may be equipped with a fluid pump (such as a pump for delivering gasoline or milk, a water pump for a fire truck, and/or the like) that draws a relatively small, stable amount of power from the engine via the PTO device. Another instance of the given vehicle model may be equipped with a vacuum accessory that draws a variable amount of power from the engine via the PTO device, wherein the amount may vary randomly and by large amounts (such as when a nozzle of the vacuum is momentarily blocked, causing the power demand to spike until the nozzle is unblocked).

Some previous techniques have tried to mitigate this problem by offering two standard sets of control characteristics for PID control techniques: slow response and fast response. Upon installation of an accessory on the vehicle, predetermined gain settings that provide either slow response (e.g., a smaller proportional gain, little or zero derivative gain) or fast response (e.g., a larger proportional gain, a higher derivative gain) may be programmed into a PID controller. However, a number of applications still may not get the engine speed stability and/or response they desire, particularly if their requirements fall between the behavior provided by the predetermined slow response and fast response settings. Further, when predetermined gain settings are specified using existing techniques, changing the control characteristics from one set of predetermined gain settings to another set of predetermined gain settings typically uses OEM specific tools to install a new calibration file.

In some previous systems, technicians are allowed to directly modify the gain settings during maintenance to suit a vehicle operator's needs. While this option allows for adjustability, it often causes more trouble due to the technician's lack of familiarity with PID control techniques and lack of definitive application-specific guidance on how to adjust the gain values to obtain the desired control characteristics. The vehicle operator may be left confused, frustrated, and with a non-functioning or poorly performing PTO device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a vehicle comprising an engine, a power take-off (PTO) device, a setting map data store, a driver interface, and a tunable controller is provided. The setting map data store is configured to store information for determining gain settings for use with a plurality of responsiveness settings. The driver interface is configured to receive a selection of a responsiveness value from an operator. The tunable controller is configured to control engine speed based on gain settings while the PTO device is drawing power from the engine to drive an accessory. The tunable controller is further configured to: receive the selected responsiveness value from the driver interface; determine gain settings using the selected responsiveness value and the information for determining gain settings stored by the setting map data store; and provide the determined gain settings to the tunable controller.

In some embodiments, a vehicle comprising an engine, a power take-off (PTO) device, and a tunable controller is provided. The tunable controller is configured to control engine speed while the PTO device is drawing power from the engine to drive an accessory by receiving an actual engine speed value and a target engine speed value; calculating a proportional term value, an integral term value, and a derivative term value based on the actual engine speed value and the target engine speed value; multiplying the proportional term value by a proportional gain, the integral term value by an integral gain, and the derivative term value by a derivative gain to generate a set of products, wherein the proportional gain, the integral gain, and the derivative gain are each determined based on a responsiveness value; and adding the set of products to determine an adjustment to a torque demand for bringing an actual engine speed closer to a target engine speed.

In some embodiments, a method for adjusting responsiveness of engine speed control in a vehicle while a power take-off device is drawing power from an engine of the vehicle. An instruction is received to adjust responsiveness to a new responsiveness value. A new set of gains is determined based on the new responsiveness value. A tunable controller of the vehicle uses the new set of gains in a PID tunable control function to control engine speed of the vehicle.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In various embodiments of the present disclosure, systems and methods are provided for controlling engine speed during use of a PTO device, wherein the responsiveness and stability of the engine controller are adjustable by an operator in the field. The use of setting maps allows fine tuning of engine controller responsiveness while also ensuring that expected performance would be achieved at any setting within the setting map.

Figure 1:
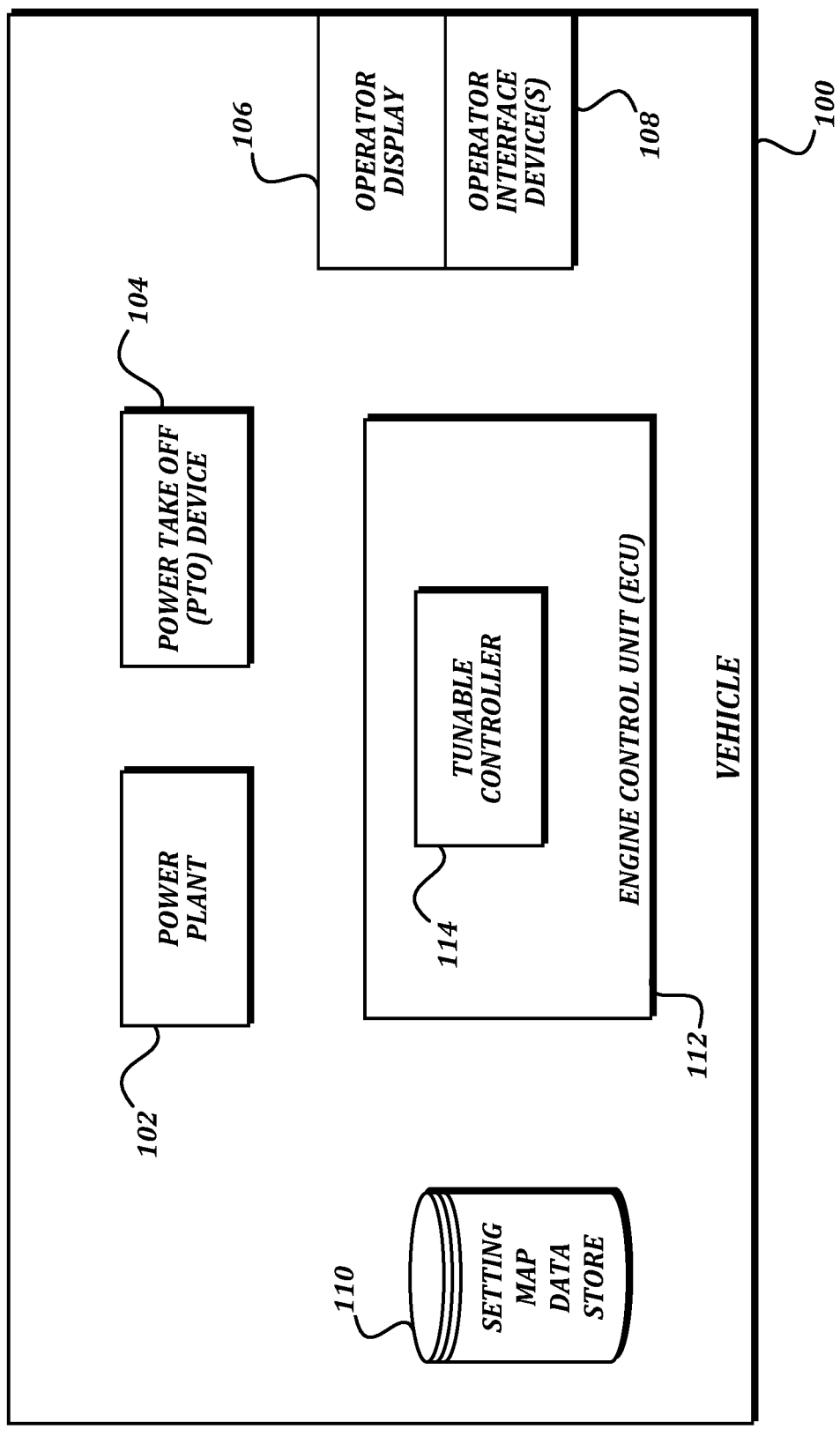
FIG. 1 is a block diagram that illustrates an exemplary embodiment of a vehicle with a tunable engine speed controller according to various aspects of the present disclosure.

FIG. 1 is a block diagram that illustrates an exemplary embodiment of a vehicle with a tunable engine speed controller according to various aspects of the present disclosure. The vehicle 100 is powered by a power plant 102. In some embodiments, the power plant 102 is an internal combustion engine. In some embodiments, other types of power plants may be used. For example, an internal combustion engine could be paired with one or more additional power sources to create the power plant 102, such as an electric motor in a hybrid vehicle. As another example, the power plant 102 may be entirely electric, and may include one or more electric motors powered by one or more batteries. In the discussion below, control of the power plant 102 is discussed as "engine speed" control for ease of discussion. The discussion below also applies to adjusting a torque produced by a power plant 102 that includes power sources other than or in addition to an internal combustion engine.

The power plant 102 typically powers vehicle motion through a drivetrain, and also provides power to a power take-off (PTO) device 104. Though a single PTO device 104 is illustrated, in some embodiments, more than one PTO device 104 may be present. The PTO device 104 can be used to provide power from the power plant 102 to one or more accessories. The types of accessories that can be powered by a PTO device 104 are widely varied. Some non-limiting examples include a vacuum, a fluid pump, a mechanical arm, a winch, a compactor, and a dump bed hoist. One of ordinary skill in the art will recognize that these various types of accessories each have different power requirements, including requiring widely different amounts of power, as well as widely different power demand stability profiles.

The vehicle 100 also includes at least one engine control unit (ECU) 112. The ECU 112 monitors vehicle status and provides control signals to the power plant 102. As illustrated, ECU 112 includes a tunable controller 114. The tunable controller 114 is used to adjust a torque request (or provide other suitable engine speed control output) in order to attempt to maintain a constant engine speed despite a variable load applied to the PTO device 104. The ECU 112 is illustrated as a single device, but in some embodiments, its functionality may be split into multiple devices. Likewise, the tunable controller 114 may be a part of the ECU 112, may be a part of a different electronic control unit, may be provided with the PTO device 104, or may be provided in a separate component.

The vehicle 100 also includes a setting map data store 110. The setting map data store 110 is configured to store information for determining gains to be used by the tunable controller 114. Further description of the information in the setting map data store 110 and the use thereof in determining gains is provided below. As understood by one of ordinary skill in the art, a "data store" as described herein may be any suitable device configured to store data for access by an ECU. A data store may also include data stored in an organized manner on a computer-readable storage medium. One example of a data store suitable for use with the needs of the ECU, which includes reliable storage with low overhead, is a file system or database management system that stores data in files (or records) on a computer-readable medium such as flash memory, random access memory (RAM), hard disk drives, firmware, and/or the like. However, any other suitable storage technique and/or device capable of quickly and reliably providing the stored setting map data in response to queries may be used, such as a key-value store, an object database, and/or the like. One of ordinary skill in the art will recognize that the single data store described herein may be separated into multiple data stores without departing from the scope of the present disclosure.

As illustrated, the vehicle 100 also includes an operator display 106 and one or more operator interface devices 108. The operator display 106 may be any type of display used in a vehicle to convey information to an operator. For example, the operator display 106 may include an LCD video screen display configured to display information to the operator much as any other computing display. As another example, the operator display 106 may include special purpose lighted displays, needle gauges, and/or the like. The operator interface devices 108 may include one or more buttons, dials, pedals, touchpads, touchscreens, or any other human interface device for receiving input from an operator. Typically, the operator will be the driver of the vehicle 100. However, in some embodiments, the operator may be a person other than the driver who is operating the vehicle 100 or an accessory thereon, such as a passenger or other person. Likewise, while the operator display 106 and operator interface devices 108 are typically within a cab of the vehicle, in some embodiments the operator display 106 and/or the operator interface devices 108 may be positioned outside of the cab, such as on or associated with an external accessory. More details of an exemplary operator display 106 and an exemplary operator interface device 108 are provided below.

It will be appreciated that the ECU 112 and/or the tunable controller 114 can be implemented in a variety of hardware, software, and combination hardware/software configurations, for carrying out aspects of the present disclosure. In one embodiment, the ECU 112 may include a memory and a processor. In one embodiment, the memory comprises a random access memory ("RAM") and an electronically erasable, programmable, read-only memory ("EEPROM"). Those of ordinary skill in the art and others will recognize that the EEPROM may be a non-volatile memory capable of storing data when a vehicle 100 is not operating. The RAM may be a volatile form of memory for storing program instructions that are accessible by the processor. Typically, a fetch and execute cycle in which instructions are sequentially "fetched" from the RAM and executed by the processor is performed. In this regard, the processor is configured to operate in accordance with program instructions that are sequentially fetched from the RAM. The memory may include program modules, applications, instructions, and/or the like that are executable by the processor.

In one embodiment, the ECU 112 is communicatively coupled to various modules that provide status information concerning various states of the vehicle 100. For example, the ECU 112 may be communicatively coupled to an engine sensor module configured to provide information about a condition of an engine of the vehicle 100. In some embodiments, the engine sensor module may provide information such as an engine speed value, an engine power output value, and/or the like. The ECU 112 may also be communicatively coupled to a PTO device sensor module configured to provide information about a condition of the PTO device 104. For example, the PTO device sensor module may provide information such as a state of the PTO device 104 (engaged or disengaged), and/or the like. The ECU 112 may also be communicatively coupled to one or more auxiliary system sensor modules configured to provide information about components of the vehicle 100 other than the power plant 102 or PTO device 104. For example, an auxiliary system sensor module may provide the ECU 112 with information concerning activation of a stability control system, activation of an anti-lock braking system, speed or torque requests made by a transmission controller, speed or torque requests made by a foot pedal or user configurable set point, and/or the like.

In one embodiment, a module includes or is associated with at least one sensor to determine at least one physical state of the vehicle, along with appropriate computing or mechanical resources to transmit the determined physical state to other components of the vehicle. For example, an engine sensor module may include a temperature sensor, an analog-to-digital converter configured to convert the output of the temperature sensor to a digital value, and a computing device configured to transmit the digital value to the ECU 112. Any type of suitable sensor or computing device known to one of ordinary skill in the art may be used to create the modules discussed herein.

The components of the vehicle 100 described herein as "communicating" or as "communicatively coupled" may be coupled by any suitable means. In one embodiment, components may be connected by an internal communications network such as a vehicle bus that uses a controller area network (CAN) protocol, a local interconnect network (LIN) protocol, and/or the like. Those of ordinary skill in the art will recognize that the vehicle bus may be implemented using any number of different communication protocols such as, but not limited to, Society of Automotive Engineer's ("SAE") J1587, SAE J1922, SAE J1939, SAE J1708, and combinations thereof. In other embodiments, components may be connected by other networking protocols, such as Ethernet, Bluetooth, TCP/IP, and/or the like. In still other embodiments, components may be directly connected to each other without the use of a vehicle bus, such as by direct wired connections between the components. Embodiments of the present disclosure may be implemented using other types of currently existing or yet to be developed in vehicle communication systems without departing from the scope of the claimed subject matter.

Figure 2:
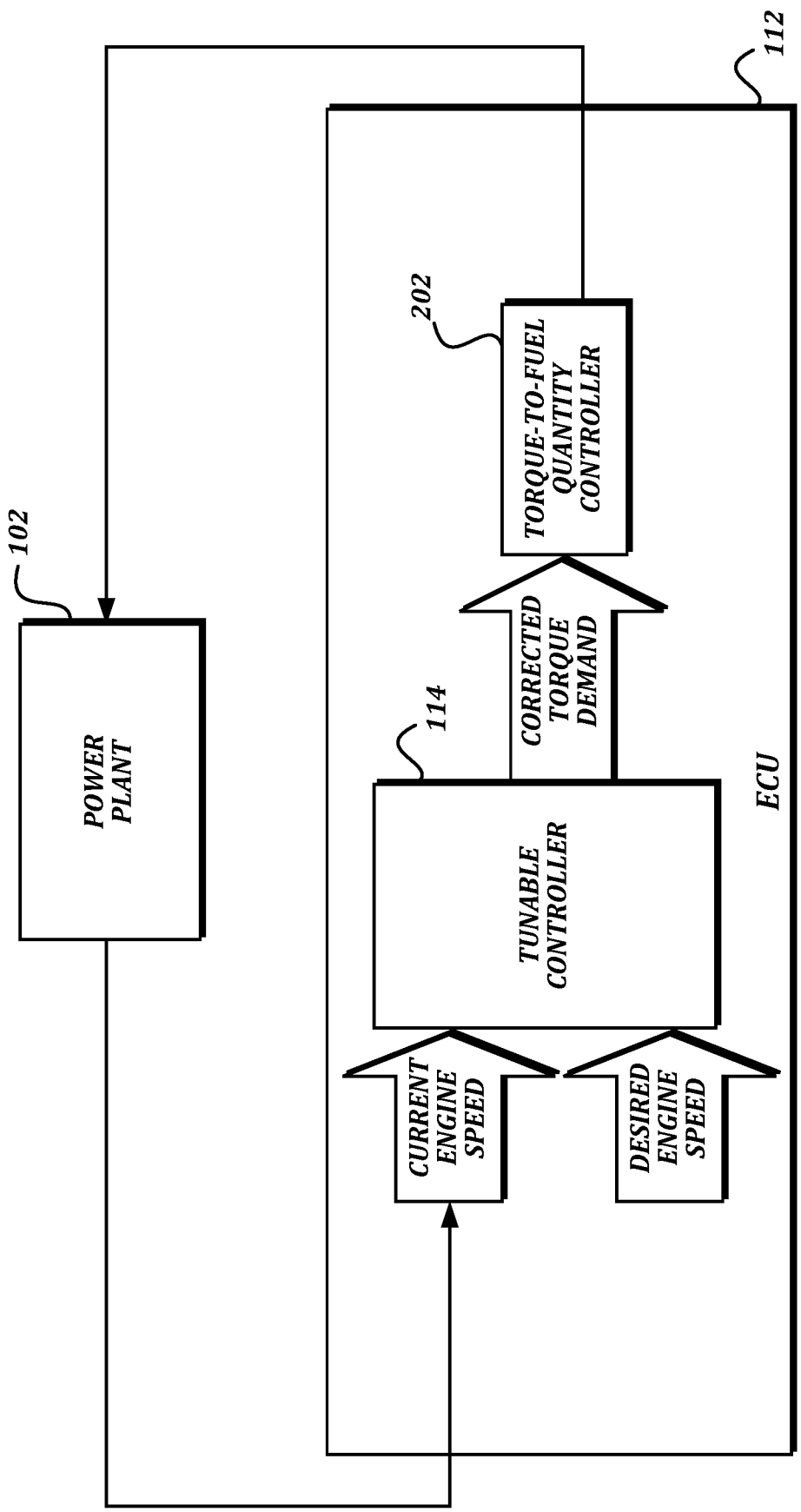
FIG. 2 is a schematic diagram that illustrates an exemplary embodiment of components and data flow for an engine speed controller with tunable responsiveness according to various aspects of the present disclosure.

FIG. 2 is a schematic diagram that illustrates an exemplary embodiment of components and data flow for an engine speed controller with tunable responsiveness according to various aspects of the present disclosure. As illustrated, the ECU 112 provides a control signal to the power plant 102. In a typical embodiment, the control signal may include a fuel amount to be provided to a fuel injection system of the power plant 102. In some embodiments, a torque request may be provided by the ECU 112 to a hybrid controller of the power plant 102, which would then determine how to provide the requested torque from a combination of power sources. In other embodiments, other control signals may be output from the ECU 112 in order to control the power plant 102.

To close the feedback loop, a sensor of the power plant 102 provides a signal to the ECU 112 to indicate a current performance state of the power plant 102. As illustrated, one typical signal provided by the power plant 102 to the ECU 112 is a signal obtained from an engine speed sensor that indicates a current engine speed value. Other sensors may also provide information to the ECU 112, including but not limited to an engine temperature sensor, an ambient temperature sensor, an HVAC blower status sensor, a coolant pump status sensor, a PTO device status sensor, a transmission temperature sensor, and/or the like. Values provided by these sensors may be used as part of the feedback loop, and/or may be used in determining gains for tuning the tunable controller 114, as discussed further below.

The ECU 112 also receives a signal that indicates a desired value for the current performance state. As illustrated, one typical signal that indicates a desired value for the current performance state is a desired engine speed value, though other embodiments might use a different value. The desired engine speed value may be provided via any suitable technique. For example, in some embodiments, the desired engine speed value may be determined based on a throttle position. In some embodiments, the desired engine speed value may be determined via a programmed engine speed setpoint for use while the PTO device 104 is engaged. In some embodiments, multiple selectable engine speed setpoints may be available. In such an embodiment, an operator may choose between the multiple selectable engine speed setpoints via one or more operator interface devices 108 either inside or outside of the cab of the vehicle 100. For example, while the PTO device 104 is engaged, the operator may press a first button to set a predetermined low engine speed value as the setpoint to conserve fuel while the accessory is in an idle state or is otherwise not actively being used. The operator may then press a second button to set a predetermined high engine speed value as the setpoint to provide a desired amount of power while the accessory is actively being used. In some embodiments, a scheduled engine speed profile may be used. For example, the desired engine speed value may be set to 1500 RPM for five minutes, and may then be increased to 1800 RPM for one minute. In some embodiments, combinations of these techniques may be used.

The current engine speed value and the desired engine speed value are provided to the tunable controller 114. The tunable controller 114 analyzes the difference between the current engine speed value and the desired engine speed value (including processing past differences between the two values) using a tunable technique to determine a corrected torque demand. If the tunable technique indicates that power needs to be increased to reduce error, the corrected torque demand will be shifted higher; likewise, if the tunable technique indicates that power needs to be decreased to reduce error, the corrected torque demand will be shifted lower. In some embodiments, a proportional-integral-derivative (PID) technique is used as the tunable technique. In some embodiments, the tunable technique may also include a feed forward component, and/or may anticipate additional future parasitic loads.

In some embodiments, the corrected torque demand is then provided to a torque-to-fuel quantity controller 202, which converts the corrected torque demand into a fuel quantity. The fuel quantity is then used to control the quantity of fuel provided to the engine 102. As discussed above, in some embodiments, hybrid power systems may use a different technique for supplying the demanded torque.

Unlike previous systems, the responsiveness and stability of the tunable controller 114 is controllable by an operator. When using a technique such as a PID technique, gain values such as the proportional gain value, integral gain value, and derivative gain value may be changed to alter the behavior of the tunable controller 114. However, many combinations of gain values will produce undesirable results, such as instability, unresponsiveness, and/or the like. To solve this problem while providing operator configurability, a plurality of sets of gain settings, or "setting maps," that provide a range of performance characteristics are stored within the setting map data store 110. The range of performance characteristics may range from "slow response/stable" to "fast response/unstable," and may include a plurality of settings therebetween. Gain settings that can provide various performances along the range of performance characteristics may be predetermined by a manufacturer of the vehicle 100 and/or a manufacturer of the power plant 102, and stored in the setting map data store 110 by the manufacturer or a technician. In some embodiments, the setting maps may be specified by storing discrete gain values associated with particular performance settings, by storing functions that define gain values over a continuum of performance settings, or in any other suitable format.

Figure 3:
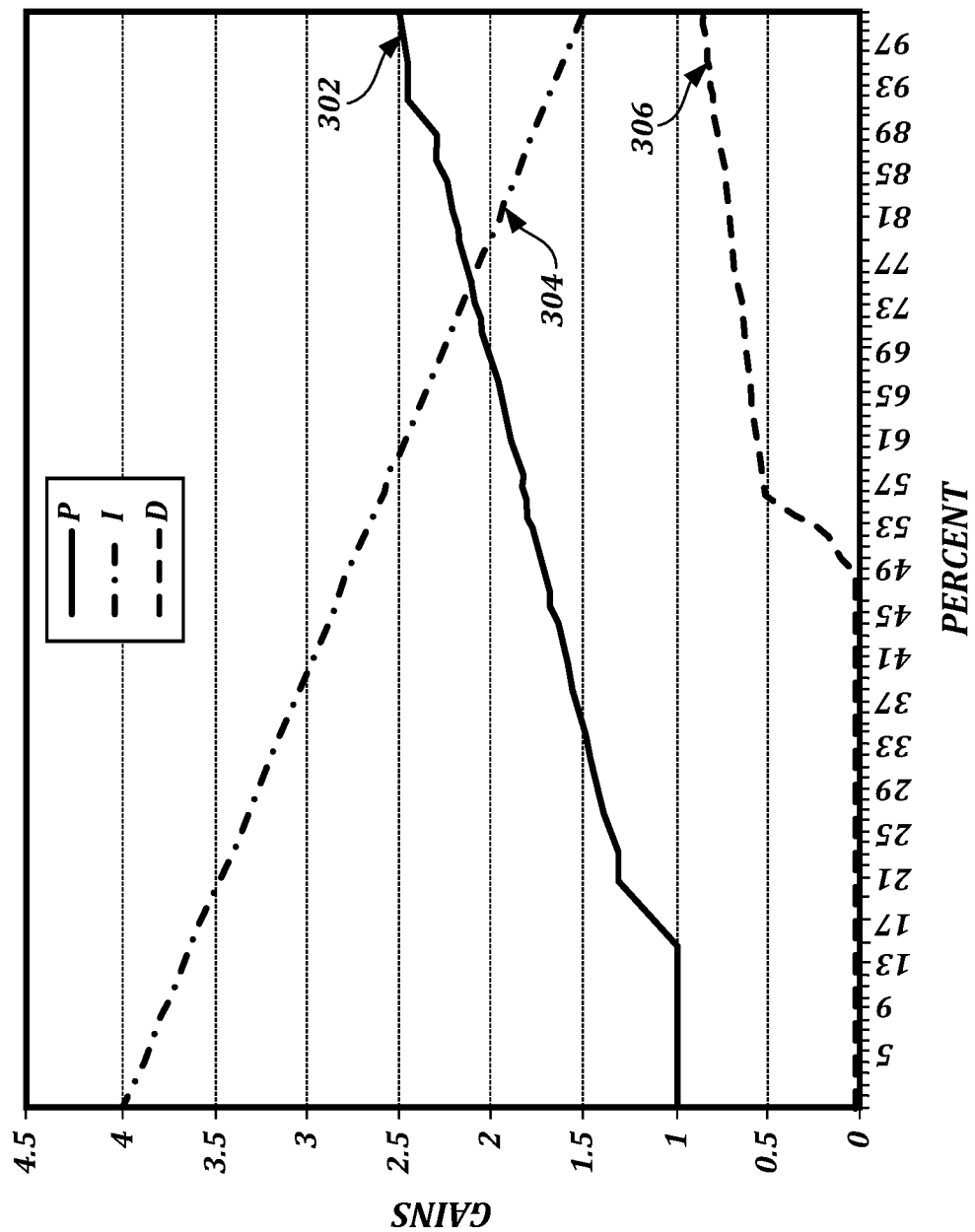
FIG. 3 is a graph that illustrates a setting map with exemplary gain settings for a PID technique according to various aspects of the present disclosure.

FIG. 3 is a graph that illustrates a setting map with exemplary gain settings for a PID technique according to various aspects of the present disclosure. The horizontal axis indicates responsiveness settings and, as illustrated, is labeled as a percentage. This is a user setting indicating a percentage of overall "responsiveness" desired, and does not necessarily indicate a "percentage" of any particular gain value. The vertical axis is labeled as a gain value. The actual values on the vertical axis are for discussion only, and in an actual setting map, different values may be used, and the scale for each of the gain settings may be different from each other.

The setting map as illustrated indicates relationships between a plurality of responsiveness settings (across the horizontal axis) and each gain value. As shown, a proportional gain value 302 remains stable for low responsiveness settings and then increases as the percentage of responsiveness increases. An integral gain value 304 decreases steadily as the percentage of responsiveness increases throughout the range of responsiveness settings. A derivative gain value 306 is set to zero for the lower half of responsiveness settings, and then increases as the percentage increases past the half-way point. In some embodiments, though smooth lines are illustrated in FIG. 3, particular gain values may be stored for discrete percentage settings within the range (for example, gain values may be stored for responsiveness settings of 5%, 10%, 15%, etc.). In some embodiments, continuous functions or graph lines may be stored to indicate gain values at any level of granularity along the horizontal axis. In embodiments wherein gain values are stored for discrete responsiveness settings, gain values may be determined for responsiveness values that fall between the discrete responsiveness settings by interpolating values between the neighboring values. For example, if a gain value of 1 is associated with a responsiveness setting of 5% and a gain value of 2 is associated with a responsiveness setting of 15%, then a gain value of 1.5 may be interpolated from this information for a responsiveness setting of 10%.

The values illustrated in FIG. 3 are examples only—in actual implementations, gain values for various responsiveness settings would be predetermined by a designer or technician for storage in the setting map data store 110. The predetermination of such settings is within the level of skill available to one of ordinary skill in the art. Further, the use of a two-dimensional setting map that maps gain values directly to responsiveness settings is illustrated and described herein for clarity and ease of illustration. In some embodiments, the setting map may be of higher dimension. For example, the gain value may be related not only to a responsiveness setting, but also to one or more values obtained from one or more sensors, such as an engine operating temperature value, an environmental temperature value, an HVAC blower state, a desired engine speed value, and/or any other suitable value. In some embodiments, more than a single set of gain values for each responsiveness setting may be provided. For example, a given responsiveness setting may be associated with a gain value schedule that changes over time, as opposed to a single static value. Such variable responsiveness settings may be used to execute a wind-up strategy.

Figure 4:
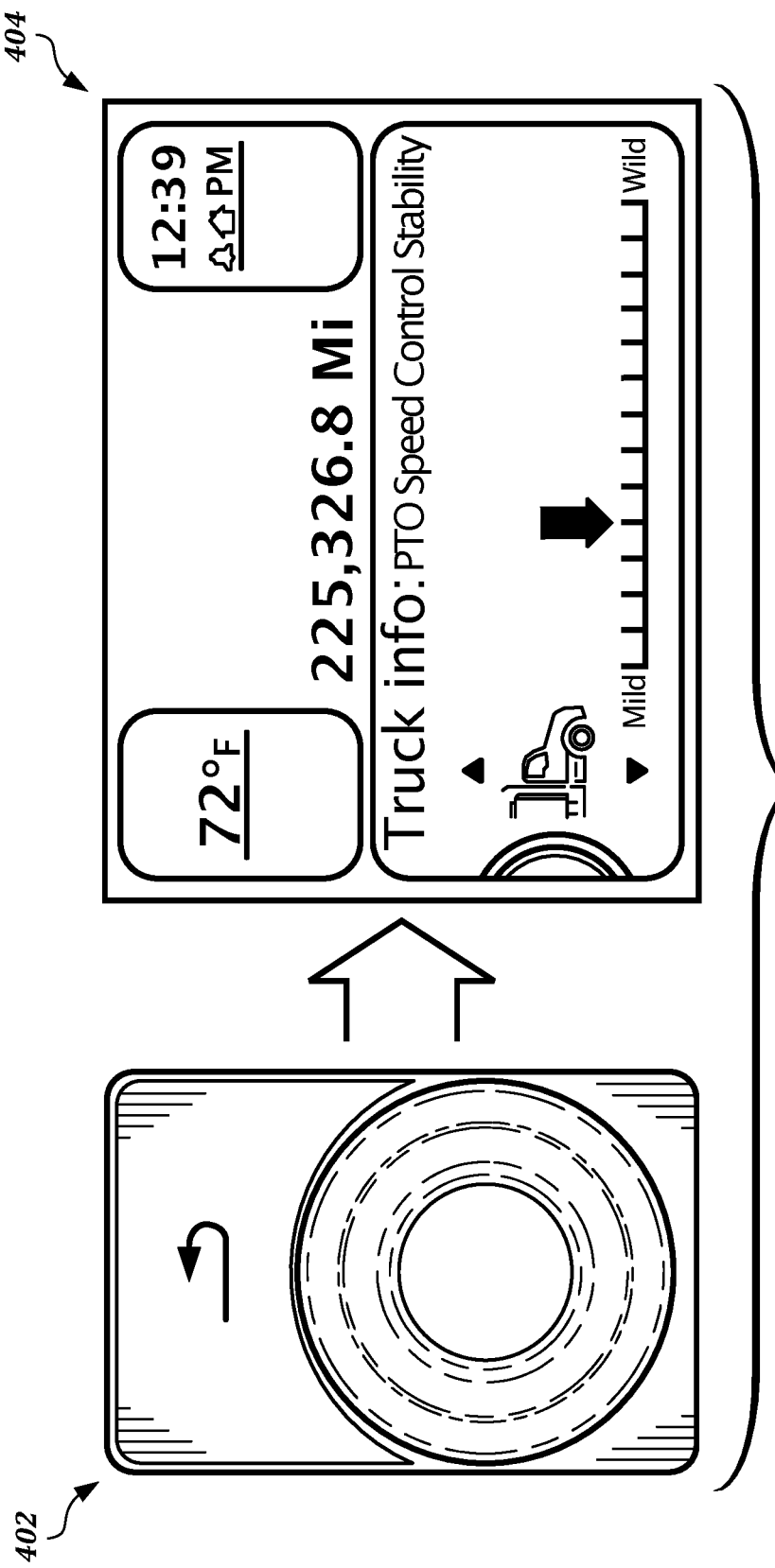
FIG. 4 illustrates an exemplary operator interface device and an exemplary operator display according to various aspects of the present disclosure.

FIG. 4 illustrates an exemplary operator interface device and an exemplary operator display according to various aspects of the present disclosure. The illustrated operator interface device 402 includes a dial and a button. In some embodiments, the dial may include an additional button or other push-detection functionality. The dial allows for navigation input, while the one or more buttons allow for selections of user interface options. The illustrated operator display 404 may include information from vehicle sensors and other components, such as an ambient temperature, a time, an alarm status, an odometer reading, and/or the like. The lower half of the operator display 404 provides a hierarchical setting interface which may be navigated using the operator interface device 402. In general, the use of operator interface devices 402 to navigate hierarchical setting interfaces is well known, and so further details of these components will be known to one of ordinary skill in the art.

As illustrated, the hierarchical setting system currently displays a "PTO Speed Control Stability" configuration setting. A scale is provided that ranges from "Mild" to "Wild." The particular labels provided on the scale are immaterial, but are intended to indicate the ends of the range of responsiveness values that may be configured. An arrow points to a portion of the scale indicating a current responsiveness value that is configured. Rotating the dial causes the arrow to move, and causes the responsiveness value configuration to change accordingly.

Though a dial is illustrated as the operator interface device 402, one of ordinary skill in the art will recognize that other interface devices could be used for a similar purpose. For example, left-right push buttons or rocker buttons, touchscreen devices, voice activation, gesture recognition, a numeric pad, and/or any other suitable device for accepting user input for specifying the new responsiveness value may be used. As another example, some embodiments may provide buttons or other interface elements to allow the configuration of "preset" responsiveness values. For example, a first button may be configurably associated with a responsiveness value of 20%, a second button may be configurably associated with a responsiveness value of 32%, and so on.

In some embodiments, the operator display 404 may be used to provide additional information to an operator of the vehicle. For example, if instability is detected, a warning may be displayed via the operator display 404 to suggest adjusting the responsiveness value. Instability may be detected by monitoring engine speed, and finding instability when the difference between the actual engine speed value and the engine speed target value is greater than a configurable threshold. In some embodiments, the warning may be disabled for a predetermined amount of time after a change has been made to the responsiveness value or the engine speed target value.

Figure 5A:
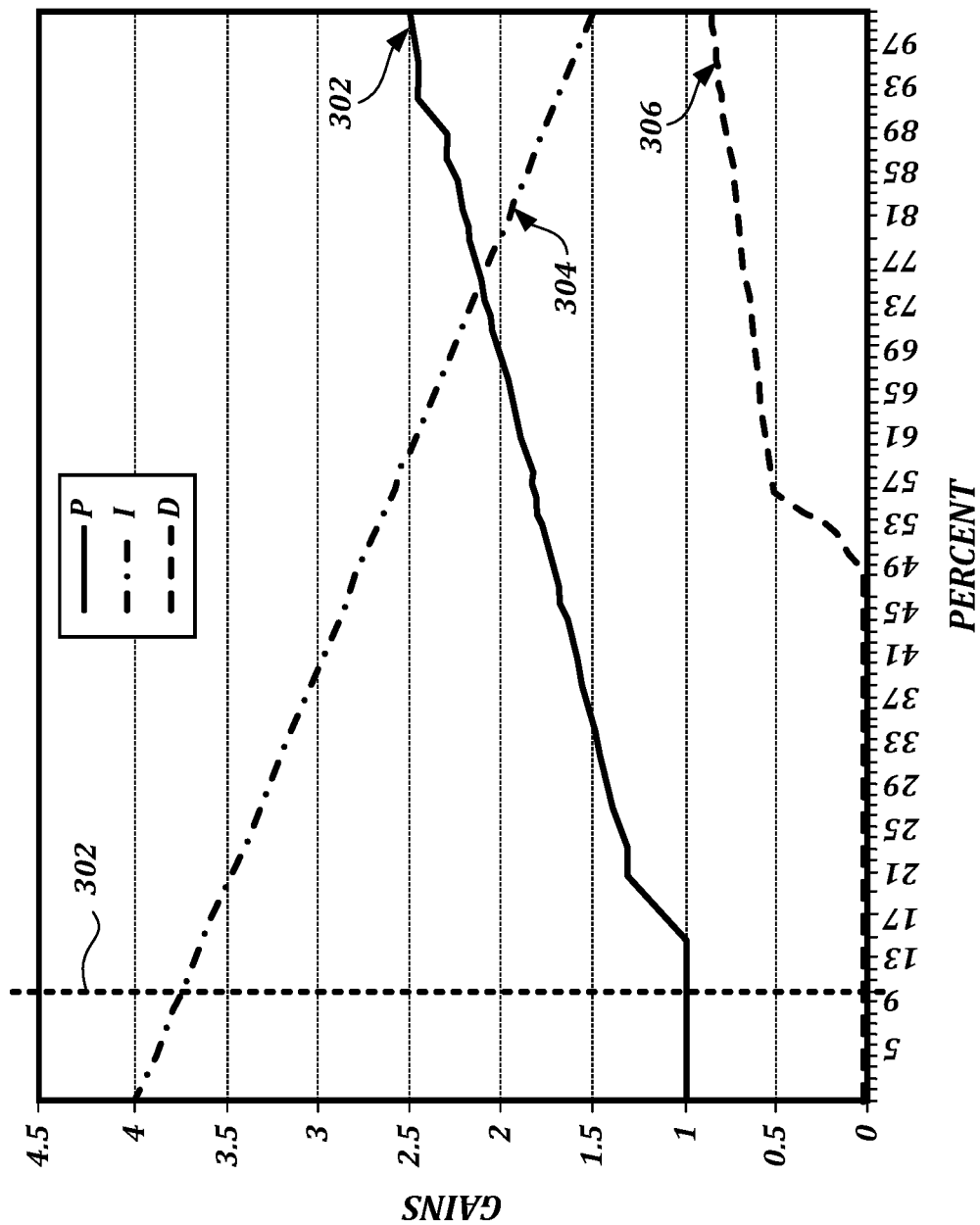
FIGS. 5A and 5B are graphs that illustrate how the gain values may be changed using the operator interface device and operator display illustrated in FIG. 4.
Figure 5B:
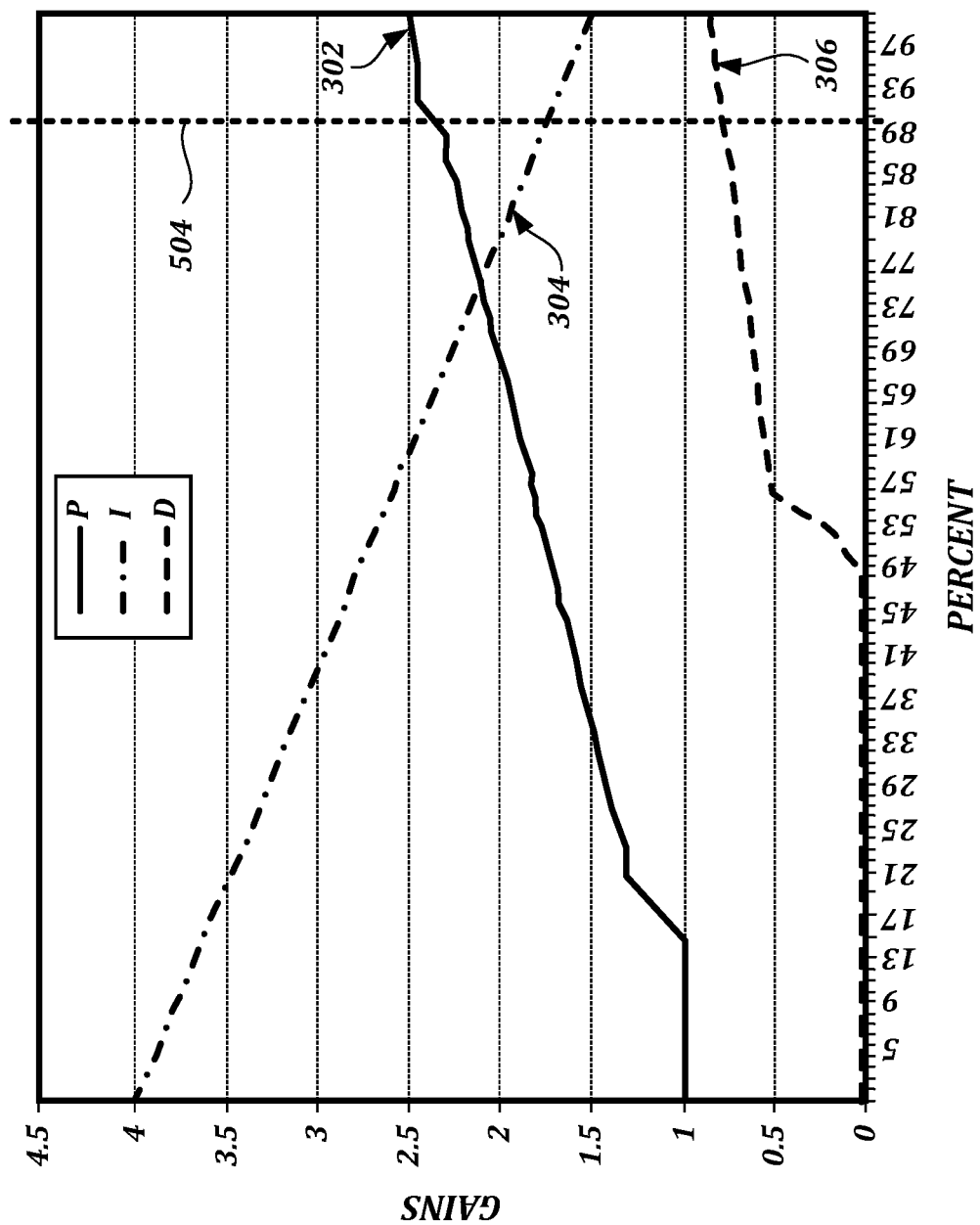

FIGS. 5A and 5B are graphs that illustrate how the gain values may be changed using the operator interface device and operator display illustrated in FIG. 4. FIGS. 5A and 5B repeat the setting map illustrated in FIG. 3. They have been updated, however, to show the responsiveness value selected using the operator display 404 and operator interface device 402. In FIG. 5A, a first responsiveness value 502 is indicated as being at 10% along the horizontal axis. At the first responsiveness value 502, the proportional gain value 302 is 1, the integral gain value 304 is about 3.75, and the derivative gain value 306 is 0. FIG. 5B illustrates a second responsiveness value 504, which illustrates the result of the operator having used the operator interface device 402 to increase the responsiveness of the controller. At the second responsiveness value 504, the proportional gain value 302 is about 2.25, the integral gain value 304 is about 1.75, and the derivative gain value 306 is about 0.75. The second responsiveness value 504 is about 90% along the horizontal axis.

While the particular gain values, curves, and relationships are merely examples and should not be seen as limiting, they do serve to show that the setting map indicates valid combinations of gain values at various responsiveness settings. Even though each of the gain values could instead be individually controllable by the operator, the predetermined combinations of gain values associated with given responsiveness settings allows the manufacturer to ensure that all of the settings available to the operator will result in the desired performance, as opposed to allowing combinations of gain settings that would result in an undesirable or unusable level of performance.

Figure 6:
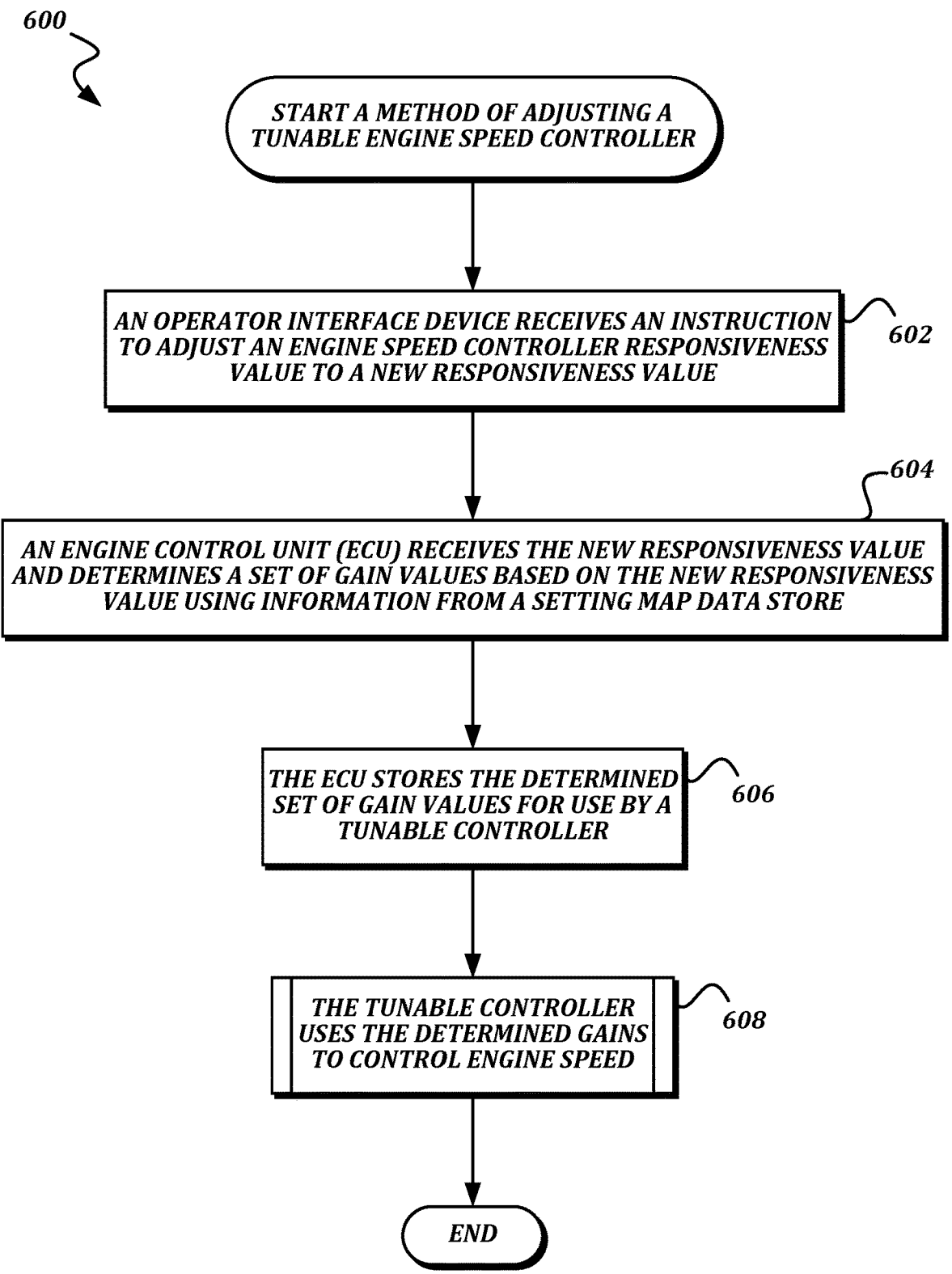
FIG. 6 is a flowchart that illustrates an exemplary embodiment of a method of adjusting a tunable engine speed controller according to various aspects of the present disclosure.

FIG. 6 is a flowchart that illustrates an exemplary embodiment of a method of adjusting a tunable engine speed controller according to various aspects of the present disclosure. From a start block, the method 600 proceeds to block 602, where an operator interface device 108 receives an instruction to adjust an engine speed controller responsiveness setting to a new responsiveness value. As described above, in some embodiments, the instruction to adjust the responsiveness value could be provided via an operator interface device 108.

Next, at block 604, an engine control unit (ECU) 112 receives the new responsiveness value and determines a set of gain values based on the new responsiveness value using information from a setting map data store 110. In some embodiments, the ECU 112 could simply retrieve the gain values associated with the new responsiveness value from the setting map data store 110, if gain values for a responsiveness setting matching the new responsiveness value are stored in setting map data store 110. In some embodiments, the ECU 112 could interpolate gain values for the new responsiveness value from stored gain values associated with responsiveness settings that are stored in the setting map data store 110, if the new responsiveness value falls between stored responsiveness settings in the setting map data store 110. This interpolation can provide very fine grained adjustability within the range of a finite number of stored responsiveness settings, while at the same time increasing the likelihood that the interpolated gain values will provide the expected performance when used together.

At block 606, the ECU 112 stores the determined set of gain values for use by a tunable controller 114. In some embodiments, the determined set of gain values may be stored in volatile or in non-volatile memory accessible by the tunable controller 114. In some embodiments, the determined set of gain values may not be "stored" for any significant amount of time, but may instead be newly determined for each cycle of the feedback loop even if the responsiveness value is not changed. At procedure block 608, the tunable controller 114 uses the determined gains to control engine speed. Any suitable procedure for doing so may be used, including the procedure 700 illustrated and described below. The method 600 then proceeds to an end block and terminates.

Figure 7:
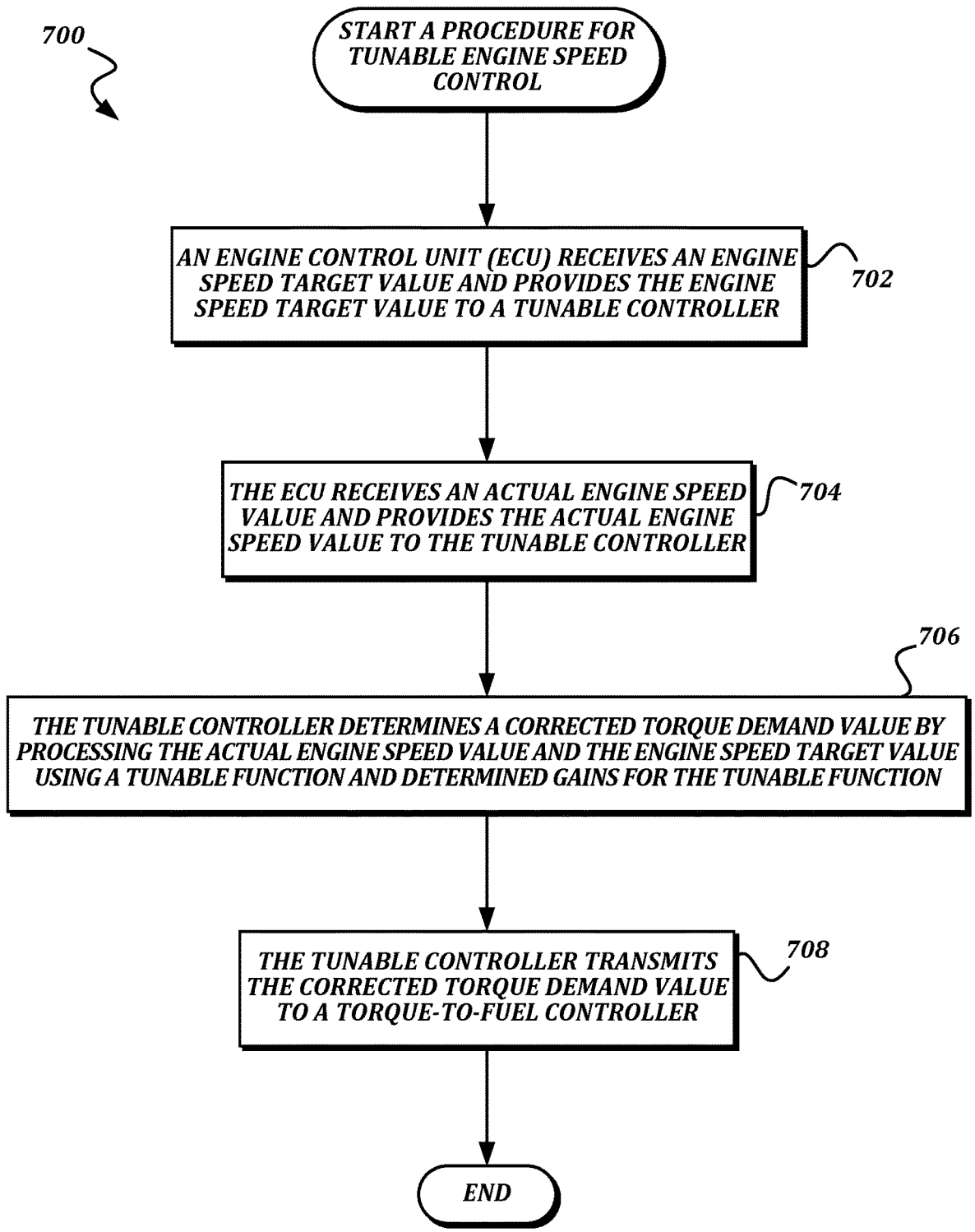
FIG. 7 is a flowchart that illustrates an exemplary embodiment of a procedure for providing tunable engine speed control according to various aspects of the present disclosure.

FIG. 7 is a flowchart that illustrates an exemplary embodiment of a procedure for providing tunable engine speed control according to various aspects of the present disclosure. The procedure 700 is an example of a procedure suitable for use in procedure block 608 illustrated in FIG. 6. From a start block, the procedure 700 advances to block 702, where an engine control unit (ECU) 112 receives an engine speed target value and provides the engine speed target value to a tunable controller 114. As discussed above, the engine speed target value may be specified by any suitable technique, such as by a programmed setpoint, a throttle position, and so on. At block 704, the ECU 112 receives an actual engine speed value and provides the actual engine speed value to the tunable controller 114. The actual engine speed value may be obtained using any suitable technique, such as from an engine speed sensor communicatively coupled to the ECU 112, or from a sensor integrated within the ECU 112.

At block 706, the tunable controller 114 determines a corrected torque demand value by processing the actual engine speed value and the engine speed target value using a tunable function and determined gains for the tunable function. The gains for the tunable function are determined based on the responsiveness value and optionally one or more other factors, as discussed above. In some embodiments, a proportional-integral-derivative (PID) function may be used as the tunable function. A general statement of a PID function that includes these gains is:

controller output=$G_p P(e)+G_i I(e)+G_d D(e)$ wherein:
e=error value, or difference between the engine speed target value and the actual engine speed value
Gp=proportional gain value
Gi=integral gain value
Gd=derivative gain value
P=proportional function I=integral function
D=derivative function One of ordinary skill in the art is considered familiar with PID controller functions, and would understand how to implement such a function using the hardware for the ECU and/or the tunable controller described above.

In some embodiments, the output of the tunable function either directly indicates or can be used to determine a corrected torque demand value. At block 708, the tunable controller 114 transmits the corrected torque demand value to a torque-to-fuel controller 202. The torque-to-fuel controller 202 translates the corrected torque demand value to an amount of fuel to be provided to the engine of the power plant 102. The amount of fuel is then provided to the engine by a fuel injection system (or other appropriate system), and the error between the actual engine speed and the target engine speed should be reduced. In embodiments wherein the power plant 102 includes power sources other than an internal combustion engine, appropriate signals other than a fuel amount may be used to cause the power plant 102 to produce the desired amount of torque.

In some embodiments, additional information may be used by the tunable controller 114 to determine a corrected torque demand value. For example, a feed forward component could anticipate additional demands from other parasitic loads, such as an engine fan speed value, a water pump speed value, an alternator demand, an HVAC blower speed, and/or the like. As another example, vehicle speed could be provided to the tunable controller 114 in order to provide a better prediction of the inertia of the power plant 102. As yet another example, a rate of change of engine speed could be provided to or calculated by the tunable controller 114, in order to predict a behavior within the PTO device 104 to prevent a belt in the PTO device 104 from slipping.

The procedure 700 then proceeds to an end block and terminates. Though descried as a linear process for ease of discussion, one of ordinary skill in the art will recognize that in many embodiments, the procedure 700 will execute repeatedly in order to maintain engine speed near the engine speed target value over an extended period of time, even in the presence of variable power demands from the PTO device 104.

While illustrative embodiments have been illustrated and described, it will be appreciated that various changes can be made therein without departing from the spirit and scope of the invention.

The embodiments of the invention in which an exclusive property or privilege is claimed are defined as follows:

1. A vehicle comprising:
an engine;
an engine control unit (ECU) configured to provide control signals to the engine;
a power take-off (PTO) device;
a setting map data store configured to store information for determining gain settings for use with a plurality of responsiveness settings;
a driver interface configured to receive a selection of a responsiveness value from an operator; and
a tunable controller configured to control engine speed based on gain settings while the PTO device is drawing power from the engine to drive an accessory;
wherein the tunable controller is configured to:
receive the selected responsiveness value from the driver interface;
determine gain settings using the selected responsiveness value and the information for determining gain settings stored by the setting map data store;
receive an engine speed target value and an actual engine speed value;
calculate an engine speed control output based on the engine speed target value, the actual engine speed value, and the gain settings; and
provide the engine speed control output to the ECU to reduce a difference between the engine speed target value and the actual engine speed value.

2. The vehicle of claim 1, wherein the driver interface is configured to present a range of responsiveness values and to receive a selection of a responsiveness value within the range of values.

3. The vehicle of claim 2, wherein the selected responsiveness value falls between responsiveness settings in the plurality of responsiveness settings; and wherein determining the gain settings includes interpolating gain settings based on stored gain settings associated with responsiveness settings surrounding the selected responsiveness value.

4. The vehicle of claim 1, wherein controlling engine speed based on gain settings includes:
receiving an actual engine speed value and a target engine speed value;
calculating a proportional term value, an integral term value, and a derivative term value based on the actual engine speed value and the target engine speed value;
multiplying the proportional term value by a proportional gain, the integral term value by an integral gain, and the derivative term value by a derivative gain to generate a set of products; and
adding the set of products to determine an adjustment to a torque demand.

5. The vehicle of claim 1, wherein the information for determining gain settings includes at least one map for each of a proportional gain, an integral gain, and a derivative gain that associates a plurality of gain settings with a plurality of responsiveness settings.

6. The vehicle of claim 5, wherein the at least one map associates the plurality of gain settings with the plurality of responsiveness settings and at least one plurality of other sensor values.

7. The vehicle of claim 6, wherein the at least one plurality of other sensor values includes one or more of a plurality of target engine speed values, a plurality of PTO states, an engine fan speed value, a water pump speed value, an alternator demand, an HVAC blower speed, a vehicle speed, and a rate of change of engine speed.

8. A vehicle comprising:
an engine;
an engine control unit (ECU) configured to provide control signals to the engine;
a power take-off (PTO) device; and
a tunable controller configured to control engine speed while the PTO device is drawing power from the engine to drive an accessory by:
receiving an actual engine speed value and a target engine speed value;
calculating a proportional term value, an integral term value, and a derivative term value based on the actual engine speed value and the target engine speed value;
multiplying the proportional term value by a proportional gain, the integral term value by an integral gain, and the derivative term value by a derivative gain to generate a set of products, wherein the proportional gain, the integral gain, and the derivative gain are each determined based on a responsiveness value;

adding the set of products to determine an adjusted torque demand for bringing an actual engine speed closer to a target engine speed; and provide the adjusted torque demand to the ECU to reduce a difference between the actual engine speed value and the target engine speed value.

9. The vehicle of claim 8, further comprising a setting map data store configured to store gain settings corresponding to a plurality of responsiveness settings.

10. The vehicle of claim 9, further comprising a driver interface configured to receive a selection of a responsiveness value.

11. The vehicle of claim 10, wherein determining the proportional gain, the integral gain, and the derivative gain based on the responsiveness value includes retrieving the proportional gain, the integral gain, and the derivative gain that are associated in the setting map data store with a responsiveness setting corresponding to the responsiveness value.

12. The vehicle of claim 10, wherein determining the proportional gain, the integral gain, and the derivative gain based on the responsiveness value includes interpolating the proportional gain, the integral gain, and the derivative gain based on gains that are associated in the setting map data store with responsiveness settings surrounding the responsiveness value.

13. The vehicle of claim 8, further comprising one or more accessories coupled to the PTO device, wherein the one or more accessories include at least one of a vacuum, a fluid pump, a mechanical arm, a winch, a compactor, and a dump bed hoist.

14. The vehicle of claim 8, wherein the target engine speed value is received from a setting stored by a driver interface, a pedal position sensor, a third-party controller, or an engine set speed toggle button.

* * * * *